2,967,754
Patented Jan. 10, 1961

2,967,754
DISPERSE DYESTUFFS OF THE ANTHRAQUINONE SERIES

Peter Bitterli and Jacques Günthard, Basel, Switzerland, assignors to Sandoz A.G., Basel, Switzerland No Drawing. Filed May 15, 1959, Ser. No. 813,366

Claims priority, application Switzerland May 28, 1958

7 Claims. (Cl. 8—26)

The present invention relates to disperse dyestuffs of the anthraquinone series which have the formula:

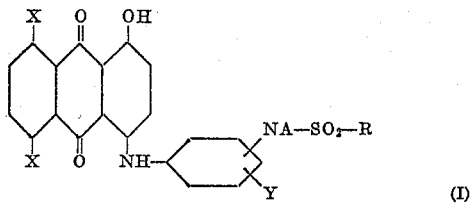

wherein one X stands for the hydroxy group and the other X for the radical

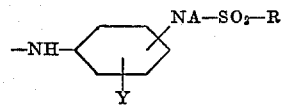

R stands for a low molecular alkyl radical which may be further substituted, A stands for hydrogen or cyanoethyl, and Y stands for hydrogen, methyl, methoxy or chlorine, and in which the radical R—$SO_2$—AN— stands in meta- or para-position to the —NH— group.

The process for the production of these dyestuffs consists in reacting 1 mole of 1.8-dihydroxy-4.5-dinitro-anthraquinone or 1 mole of 1.5-dihydroxy-4.8-dinitroanthraquinone or 1 mole of a mixture in any desired proportions of 1.8-dihydroxy-4.5-dinitroanthraquinone and 1.5-dihydroxy-4.8-dinitroanthraquinone with at least 2 moles of an amine of the formula:

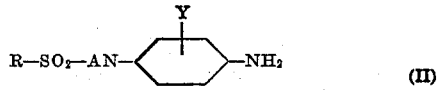

wherein R, A and Y possess the aforecited meanings and the radical R—$SO_2$—AN— is in meta- or para-position to the amino group.

The substituent R is preferably a low molecular alkyl (e.g. methyl, ethyl, propyl), hydroxyalkyl (e.g. hydroxyethyl, hydroxypropyl, dihydroxypropyl), alkoxyalkyl (ethoxyethyl, methoxybutyl, methoxypropyl) or acyloxyalkyl (acetoxyethyl, propionyloxyethyl). Y is preferably hydrogen or methyl.

It is best to carry out the reaction at high temperatures, preferably in excess of 150° C., in an inert organic solvent, e.g. nitrobenzene, phenol, a cresol mixture, di- or trichlorobenzene, methyl- or butyldiethylene glycol, or cyclohexanone. The pressure applied may be normal or higher than atmospheric; in the latter case solvents which boil below 100° C. or at slightly higher temperatures may be used, e.g. benzene, chlorobenzene or dioxane.

The progress of the reaction can be controlled by chromatographic absorption on a talc column. Condensation is continued until both the nitro groups of the starting product have been exchanged, i.e. until an orange-yellow or violet zone is no longer visible in the talc column. The reaction products can be isolated, for example, by precipitation with a suitable agent, by evaporation to a small volume under reduced pressure, or by removal of the solvent by steam distillation and filtration with suction of the so precipitated dyestuff. If the process is carried out under alkaline conditions, e.g. in presence of sodium carbonate or sodium hydroxide, the low molecular acyloxyalkyl group which may occur in the radical R is saponified to the hydroxyalkyl group.

The dyestuffs obtained are generally soluble in the commonly used organic solvents. Upon conversion into a finely divided state, e.g. by grinding the aqueous suspension of the dyestuff in presence of a suitable dispersing agent, they are highly suitable for dyeing and printing cellulose ester and cellulose ether fibers, linear aromatic polyester, polyvinyl ester, synthetic polyamide and polyurethane fibers. They are equally suitable for the mass coloration of molded goods of cellulose esters or ethers, polyesters, polyurethanes, polyvinyl esters and polyacrylonitriles. The dyeings on secondary cellulose acetate possess good to very good fastness to light, washing, perspiration, gas fumes, decatizing, rubbing, formaldehyde and dry cleaning, and are stable to resin crease-resistant finishes.

The dyeings on cellulose triacetate and polyester fibers possess good fastness to light, washing, perspiration, pleating and sublimation.

The dyeings can be discharged with chlorite. The dyestuffs reserve viscose very well and cotton fairly well.

In the following examples the parts and percentages are by weight and the temperatures are in degrees centigrade.

Example 1

50 parts of 1.8-dihydroxy-4.5-dinitroanthraquinone, 85 parts of 3-methylsulfonylamino-1-aminobenzene are stirred into 200 parts of nitrobenzene at 160° over a period of 20 hours. The mixture is run into 1000 parts of water containing 40 parts of a 30% sodium hydroxide solution, and the nitrobenzene is distilled off with steam. The dissolved dyestuff is precipitated with 60 parts of sodium bicarbonate and after stirring for 16 hours at 20° it is filtered with suction and washed neutral with cold water. The product is mixed with 500 parts of 5% hydrochloric acid, and the precipitate filtered with suction, washed until of neutral reaction and dried.

1 part of the dyestuff thus obtained, 1 part of the sodium salt of dinaphthylmethanedisulfonic acid and 8 parts of water are ground together until a fine dispersion is obtained, which is poured into a solution of 3000 parts of water and 6 parts of Marseilles soap. 100 parts of a fabric of secondary cellulose acetate are introduced into this bath, which is heated to 80° in the course of 30 minutes and maintained at this temperature for a further hour. The dyed fabric is removed, rinsed with water and dried. It is dyed a blue shade which is fast to washing, light, gas fumes, rubbing and perspiration. Blue dyeings with the same excellent fastness properties and, in addition, good fastness to sublimation and pleating, are obtained on triacetate and linear aromatic polyester fibers from the above dyebath at 98° and in presence of a swelling agent. Viscose present in the dyebath is reserved very well, and cotton fairly well.

Example 2

10 parts of 1.5-dihydroxy-4.8-dinitroanthraquinone and 12.5 parts of 3-methylsulfonylamino-1-aminobenzene are stirred into 60 parts of nitrobenzene for 20 hours at 160°. The solvent is then distilled off with steam and the residue dissolved in 500 parts of a 5% sodium carbonate solution at 80°. On the addition of 25 parts of sodium bicarbonate the dyestuff is precipitated again; it is filtered with suction at room temperature and washed with water until of neutral reaction. The product is stirred into 500 parts of 2% hydrochloric acid, the residue filtered with suction and washed until neutral. The dyestuff obtained dyes cellulose acetate from aqueous dispersion in bright blue shades. The dyeings are very fast to light and gas fumes.

When the 12.5 parts of 3-methylsulfonylamino-1-aminobenzene in this example are replaced by an equivalent amount of 4-methylsulfonylamino-1-aminobenzene, 3 - ethylsulfonylamino - 1 - aminobenzene, 3 - [N - (2'-cyano)-ethyl-N-methylsulfonylamino]-1-aminobenzene or 4 - [N - ( 2' - cyano) - ethyl - N - methylsulfonylamino]-1-aminobenzene, dyestuffs are obtained with the same good fastness properties.

In place of nitrobenzene, 150 parts of chlorobenzene can be used and the reaction conducted in an autoclave at 160-170° under pressure.

Example 3

6 parts of 1.5-dihydroxy-4.8-dinitroanthraquinone, 4 parts of 1.8-dihydroxy-4.5-dinitroanthraquinone and 12.5 parts of 3-methylsulfonylamino-1-aminobenzene in 50 parts of nitrobenzene are heated to 200° in the course of 2 hours and stirred at the same temperature for another 4 hours. The further stages of the process are as described in Example 1. The product is a blue disperse dyestuff which possesses higher affinity for secondary cellulose acetate than the dyestuffs of Examples 1 and 2.

The dyeings obtained with this dyestuff show very good fastness to light, washing, perspiration, gas fumes, rubbing, dry cleaning, formaldehyde and decatizing, and are stable to crease-resistant finishing processes. Viscose present in the dyebath is reserved very well, and cotton fairly well.

Example 4

50 parts of a mixture of 1.5-dihydroxy-4.8-dinitroanthraquinone and 1.8-dihydroxy-4.5-dinitroanthraquinone are reacted with 85 parts of 3-methylsulfonylamino-1-aminobenzene by the method described in Example 1. After further processing on the lines of that example a dyestuff is obtained which is identical with that of Example 3.

The mixture of dihydroxy-dinitroanthraquinones is obtained as follows: the isomeric mixture of anthraquinone-1.5- and 1.8-disulfonic acid produced by disulfonation of anthraquinone, after separation of the accompanying 1.6- and 1.7-isomers, is chlorinated with sodium chlorate and hydrochloric acid to give 1.5- and 1.8-dichloroanthraquinone which is reacted with sodium phenolate to form 1.5- and 1.8-diphenoxyanthraquinone. On nitration and alkaline saponification this yields the mixture of 1.5-dihydroxy-4.8-dinitroanthraquinone and 1.8-dihydroxy-4.5-dinitroanthraquinone.

Example 5

8 parts of 1.8-dihydroxy-4.5-dinitroanthraquinone, 15 parts of 3-[N-(2'-cyano)-ethyl-N-methylsulfonylamino]-1-aminobenzene and 80 parts of nitrobenzene are heated with stirring for 20 hours at 170°. The mixture is then diluted with 800 parts of ethyl alcohol. The precipitated dyestuff is filtered off, washed first with alcohol, then with a hot 1% sodium carbonate solution until the effluent is colorless, and finally with hot water till the washed product is neutral. The blue disperse dyestuff obtained gives dyeings of very good fastness to light, washing, perspiration and gas fumes.

Example 6

A mixture of 4 parts of 1.8-dihydroxy-4.5-dinitroanthraquinone and 4 parts of 1.5-dihydroxy-4.8-dinitroanthraquinone are heated with 15 parts of 4-methylsulfonylamino-1-aminobenzene and 50 parts of methyldiethylene glycol for 20 hours at 160° with stirring. The reaction mass is diluted with 500 parts of methyl alcohol. The precipitated dyestuff is filtered off and washed with methyl alcohol and then with water. A blue disperse dyestuff is obtained which gives dyeings of good fastness to light, washing, perspiration and gas fumes.

Example 7

100 parts of the dihydroxy-dinitroanthraquinone mixture used in Example 4, 150 parts of 3-methylsulfonylamino-1-aminobenzene and 300 parts of cyclohexanone are stirred for 20 hours at 150-152°. The solvent is then distilled off with steam and the residue dissolved in 2000 parts of water and 70 parts of a 30% sodium hydroxide solution at 50°. On the addition of 120 parts of sodium bicarbonate the dyestuff is again precipitated, filtered with suction at 20°, and washed with water until neutralized. The product is stirred with 1000 parts of 5% hydrochloric acid, filtered with suction, washed with cold water until of neutral reaction, and dried. The dyestuff obtained is identical with that of Example 4.

Example 8

When the 3 - methylsulfonylamino - 1 - aminobenzene specified in Examples 1 and 3 is replaced by the equivalent amount of one of the undermentioned amines, analogous dyestuffs with similar properties are obtained.

| Amines | Shade of Dyeing on Cellulose Acetate |
|---|---|
| 3-Methylsulfonylamino-4-methyl-1-aminobenzene | blue. |
| 3-Ethylsulfonylamino-1-aminobenzene | Do. |
| 3-Propylsulfonylamino-1-aminobenzene | Do. |
| 3-Isopropylsulfonylamino-1-aminobenzene | Do. |
| 4-Methylsulfonylamino-1-aminobenzene | greenish blue. |
| 3-(2'-Hydroxy)-ethylsulfonylamino-1-aminobenzene | reddish blue. |
| 3-(2'-Acetoxy)-ethylsulfonylamino-1-aminobenzene | Do. |
| 3-(2'-Ethoxy)-ethylsulfonylamino-1-aminobenzene | Do. |
| 3-[N-(2'-Cyano)-ethyl-N-ethylsulfonylamino]-1-aminobenzene | blue. |
| 3-Ethylsulfonylamino-4-methyl-1-aminobenzene | Do. |
| 3-(2'-Propionyloxy)-ethylsulfonylamino-1-aminobenzene | reddish blue. |
| 3-(3'-Methoxy)-propylsulfonylamino-1-aminobenzene | Do. |
| 3-(3'-Acetoxy)-propylsulfonylamino-1-aminobenzene | Do. |
| 3-(2'-Acetoxy)-propylsulfonylamino-1-aminobenzene | Do. |
| 3-(3'-Hydroxy)-propylsulfonylamino-1-aminobenzene | Do. |

Formulae of representative dyestuffs of the foregoing examples are as follows.

*Example 1*

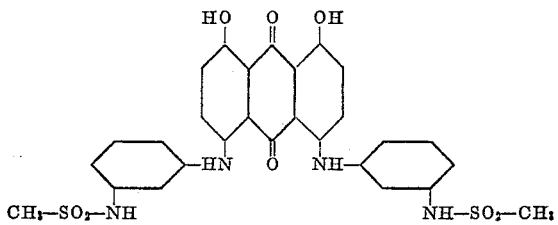

*Example 2*

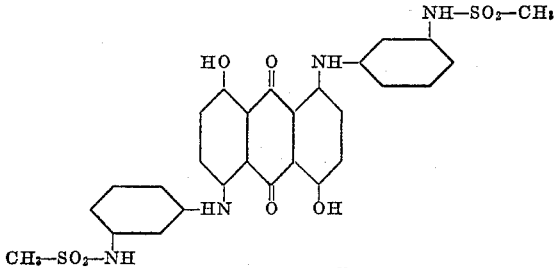

First dyestuff

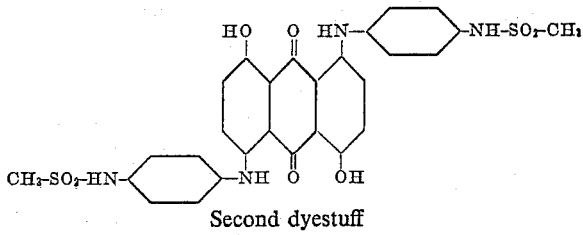

Second dyestuff

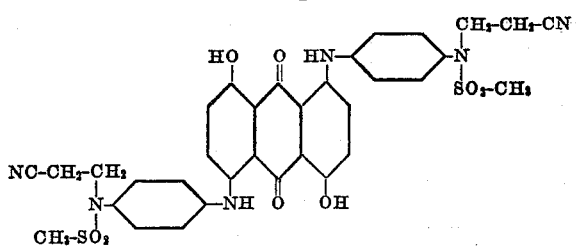

Third dyestuff

*Examples 3, 4 and 7*

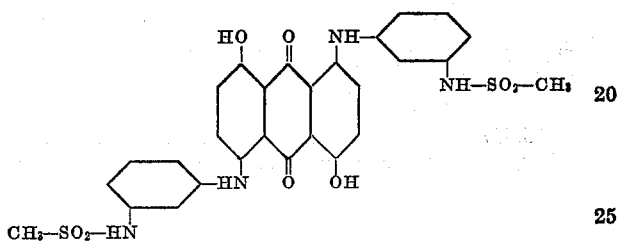

and

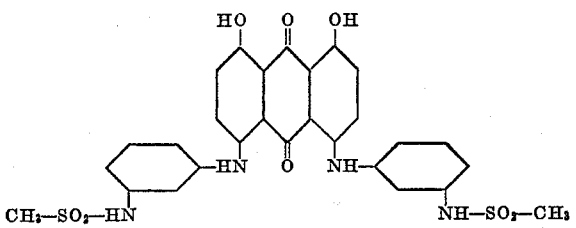

*Example 5*

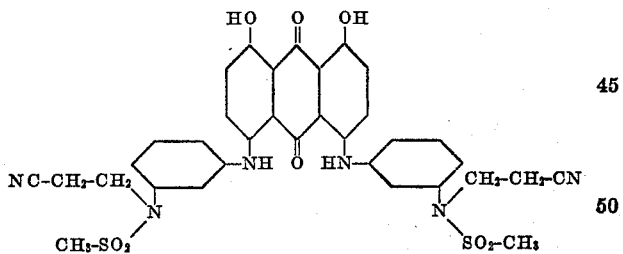

*Example 6*

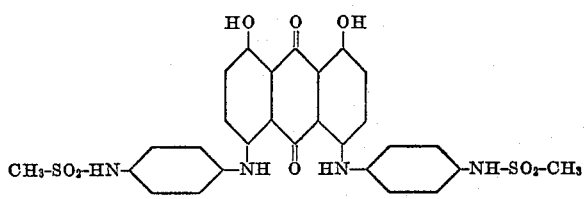

and

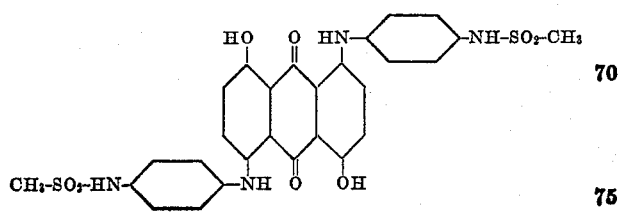

Having thus disclosed the invention what we claim is:

1. A disperse dyestuff of the anthraquinone series of the formula

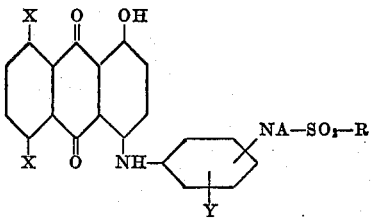

wherein:
one X stands for the hydroxy group and the other X for the radical

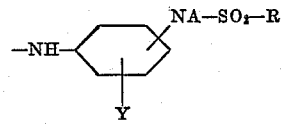

R stands for a member selected from the group consisting of low molecular alkyl, low molecular hydroxyalkyl, low molecular alkoxyalkyl and low molecular acyloxyalkyl,
A stands for a member selected from the group consisting of hydrogen and cyanoethyl, and
Y stands for a member selected from the group consisting of hydrogen and methyl, and in which the radical —NA—SO$_2$—R stands in one of the meta- and the para-positions to —NH—.

2. The disperse dyestuff of the anthraquinone series of the formula

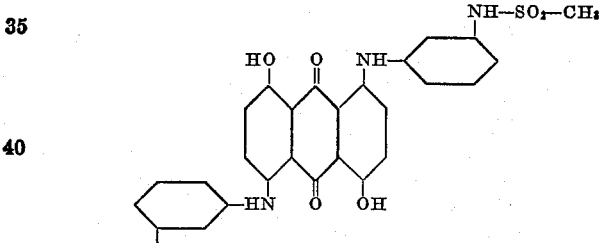

3. The disperse dyestuff of the anthraquinone series of the formula

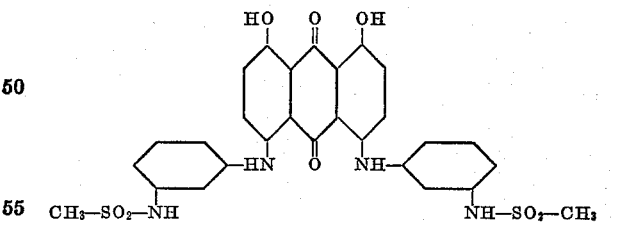

4. The disperse dyestuff of the anthraquinone series of the formula

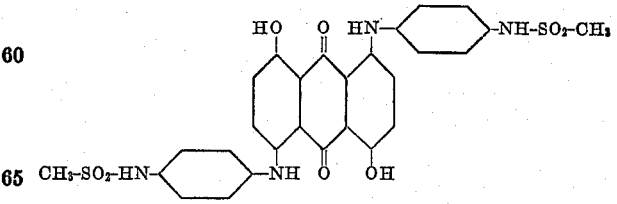

5. The disperse dyestuff of the anthraquinone series of the formula

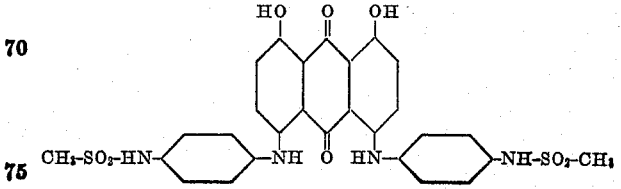

6. The disperse dyestuff of the anthraquinone series of the formula
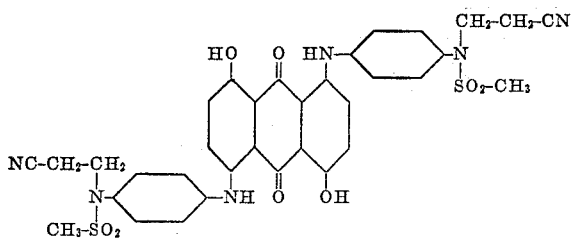
7. The mixture of disperse dyestuffs of the anthraquinone series which correspond to the formulae
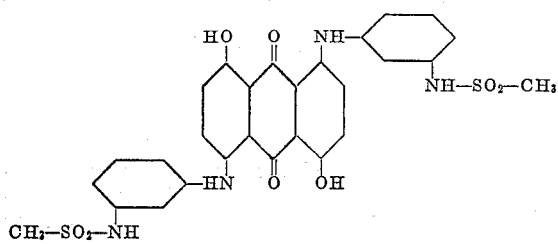
and
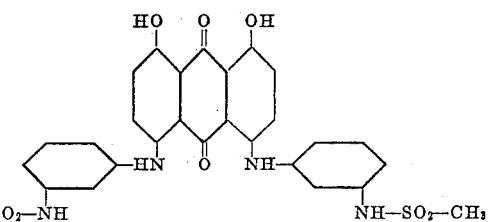
References Cited in the file of this patent
UNITED STATES PATENTS
| | | |
|---|---|---|
| 2,060,186 | Felix et al. | Nov. 10, 1936 |
| 2,342,191 | Grossmann | Feb. 22, 1944 |
| 2,485,197 | Grossmann | Oct. 18, 1949 |
| 2,506,020 | Grossmann | May 2, 1950 |
| 2,894,800 | Guenthard et al. | July 14, 1959 |
FOREIGN PATENTS
| | | |
|---|---|---|
| 815,697 | France | July 20, 1937 |
| 260,551 | Switzerland | Aug. 1, 1949 |